United States Patent
Lee et al.

(10) Patent No.: US 8,752,188 B2
(45) Date of Patent: Jun. 10, 2014

(54) APPARATUS AND METHOD FOR FORENSIC MARKING OF DIGITAL CONTENT

(75) Inventors: Jung Ho Lee, Gangwon-do (KR); Yong Seok Seo, Daejeon (KR); Won Young Yoo, Daejeon (KR); Young Ho Suh, Daejeon (KR); Sang Kwang Lee, Daejeon (KR); Jee Hyun Park, Daejeon (KR); Young Suk Yoon, Seoul (KR); Seung Jae Lee, Daejeon (KR); Jung Hyun Kim, Daejeon (KR); Sung Min Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/310,013

(22) Filed: Dec. 2, 2011

(65) Prior Publication Data

US 2012/0151598 A1   Jun. 14, 2012

(30) Foreign Application Priority Data

Dec. 6, 2010   (KR) .................. 10-2010-0123584

(51) Int. Cl.
*G06F 7/04* (2006.01)
*G06F 17/30* (2006.01)

(52) U.S. Cl.
USPC .............................................. 726/26; 380/28

(58) Field of Classification Search
USPC .................................................. 726/26
See application file for complete search history.

(56) References Cited

U.S. PATENT DOCUMENTS

| | | | | |
|---|---|---|---|---|
| 3,093,707 | A * | 6/1963 | Nicholson et al. | 178/23 A |
| 2004/0264736 | A1 * | 12/2004 | Parisis et al. | 382/100 |
| 2007/0012782 | A1 * | 1/2007 | Winograd | 235/487 |
| 2008/0002854 | A1 * | 1/2008 | Tehranchi et al. | 382/100 |
| 2008/0313201 | A1 * | 12/2008 | Bishop | 707/101 |
| 2009/0080689 | A1 * | 3/2009 | Zhao et al. | 382/100 |
| 2009/0326961 | A1 * | 12/2009 | Petrovic et al. | 704/500 |
| 2010/0002267 | A1 * | 1/2010 | Mikami | 358/3.28 |
| 2011/0122778 | A1 * | 5/2011 | Bloom | 370/252 |
| 2011/0188700 | A1 * | 8/2011 | Kim et al. | 382/100 |
| 2011/0194728 | A1 * | 8/2011 | Kutcka et al. | 382/100 |

FOREIGN PATENT DOCUMENTS

| | | |
|---|---|---|
| KR | 10-2005-0078767 | 8/2005 |
| KR | 10-2009-0079045 | 7/2009 |
| KR | 10-2011-0117881 | 10/2011 |

OTHER PUBLICATIONS

Mark M. Pollitt, MS ; An Ad Hoc Review of Digital Forensic Models; IEEE; Year: 2007; pp. 1-10.*

* cited by examiner

*Primary Examiner* — Mohammad W Reza
*Assistant Examiner* — Monjour Rahim
(74) *Attorney, Agent, or Firm* — Staas & Halsey LLP

(57) ABSTRACT

Provided are an apparatus and method for forensic marking of digital content. The apparatus includes a forensic marker configured to generate first content by inserting a first binary forensic mark in original content and second content by inserting a second binary forensic mark in the original content, and when a content service request is generated, combine the first content and the second content on the basis of information about a user who has requested the content service and thereby generate third content in which a forensic mark corresponding to the user information is inserted, a content database configured to store the first and second content, and a transceiver configured to transmit the third content.

14 Claims, 3 Drawing Sheets

APPARATUS AND METHOD FOR FORENSIC MARKING OF DIGITAL CONTENT

CLAIM FOR PRIORITY

This application claims priority to Korean Patent Application No. 10-2010-0123584 filed on Dec. 6, 2010 in the Korean Intellectual Property Office (KIPO), the entire contents of which are hereby incorporated by reference.

BACKGROUND

1. Technical Field

Example embodiments of the present invention relate in general to copyright protection technology, and more particularly, to an apparatus and method for forensic marking of digital content that can be applied to multimedia content provided by an online service provider (OSP).

2. Related Art

Due to the development of information and communications technology and digital devices, demands for digital content are explosively increasing. However, most pieces of movie or music content are being illegally shared through OSPs, and thus copyright infringement is significantly increasing. According to an investigation of the Korean Film Council (KOFIC) (using data from December 2007), illegal downloading is so widespread that 47.3% of Koreans have performed illegal downloading.

Also, with the advent of the Web2.0 era, consumers who have merely consumed digital content are being developed into active producers through user created content (UCC), and cases of using a movie or drama, which is an existing work, in this process are drastically increasing. According to 2006 investigation results of the Copyright Protection Center, 84% of UCC corresponds to copyright infringement.

To prevent such copyright infringement of digital content, the government has amended copyright laws to strengthen control, and also caused OSPs to cope with copyright infringement through technical protection action. For this reason, OSPs apply forensic marking technology to digital content as a part of the technical protection action.

Forensic marking technology involves inserting information about a seller, copyright holder, or purchaser in digital data such as an image or sound source, and enables extraction of the previously-inserted information even when a user transforms digital content into another form for a dishonest purpose.

For example, when an OSP provides digital content, the OSP may insert information about a purchaser in the content using forensic marking technology. In this case, when a copyright infringement occurs later, it is possible to track and accuse an initial distributor of the content, and improve the sense of citizenship regarding copyright protection.

Unlike conventional digital rights management (DRM) technology that can only be used in a specific device or authenticated single device, forensic marking technology can be freely used in all devices and modified or processed according to a personal purpose, thus not limiting the use right of users.

However, a process of inserting a forensic mark in digital content involves decoding the entire content, inserting the forensic mark, and encoding the content again, thus requiring a considerable amount of calculation and much time.

When digital content is downloaded from an OSP via a high-speed communication network used in general homes, it takes a very short time, that is, downloading is completed within several seconds to several minutes. On the other hand, as mentioned above, it takes a long time to insert a forensic mark in digital content. Thus, if a forensic mark is inserted when a request of a purchaser is received, a service delay occurs. Currently-served content in which a forensic mark has been inserted is generated before a request of a purchaser is received, and thus does not include information about a purchaser or content transmission time.

To solve this problem, Korean laid-open patent publication No. 2009-79045 (Method and Apparatus for Realtime-Providing Multimedia Contents Comprising Watermark) discloses a method of preparing multimedia content in which a watermark has been inserted before a request of a user is received, relating an identification (ID) of a user with an ID of the multimedia content in which the watermark has been inserted, and then providing the content when a request of the user is received.

However, in Korean laid-open patent publication No. 2009-79045, a very large storage space is required to store content that is frequently requested for purchase because pieces of the same content have different watermark values, and a storage space is wasted or content cannot be provided when demand forecasting is wrong. Also, instead of information about a purchaser being directly inserted in a watermark value, an ID having no meaning is inserted. Thus, to track down the original purchaser of illegally-shared content, a matching table between a content purchaser and an ID should be provided by each OSP.

SUMMARY

Accordingly, example embodiments of the present invention are provided to substantially obviate one or more problems due to limitations and disadvantages of the related art.

Example embodiments of the present invention provide an apparatus for forensic marking of digital content capable of generating and serving content in which a forensic mark including user information has been inserted at high speed.

Example embodiments of the present invention also provide a method for forensic marking of digital content capable of generating and serving content in which a forensic mark including user information has been inserted at high speed.

In some example embodiments, an apparatus for forensic marking of digital content includes: a forensic marker configured to generate first content by inserting a first binary forensic mark in original content and second content by inserting a second binary forensic mark in the original content, and when a content service request is generated, combine the first content and the second content on the basis of information about a user who has requested the content service and thereby generate third content in which a forensic mark corresponding to the user information is inserted; a content database configured to store the first and second content; and a transceiver configured to transmit the third content.

The forensic marker may include: a forensic mark inserting unit configured to generate the first content by inserting a forensic mark of a binary "0" in the original content and the second content by inserting a forensic mark of a binary "1" in the original content, and then store the first and second content in the content database; an information collector configured to collect the information about the user who has requested the content service and provide the collected user information when the content service request is generated; and a content combiner configured to generate the third content by combining the first content and the second content on the basis of the provided user information.

The first content and the second content may have identical data sizes to each other, and the same playing time as the original content.

The user information may include at least one piece of information among a user identification (ID), content request time, content provision time, and content information.

The forensic marker may combine the first content and the second content in a size corresponding to a multiple of a reference value of a frame size or packet size on the basis of a type of the original content.

The forensic marker may determine a unit in which the first binary forensic mark and the second binary forensic mark are inserted on the basis of a type or size of the original content.

In other example embodiments, a method for forensic marking of digital content includes: collecting information of a user who requests a content service; when first content obtained by inserting a first binary forensic mark in content requested by the user and second content obtained by inserting a second binary forensic mark in the content are in a content database, reading the first content and the second content from the content database; combining the first content and the second content on the basis of the collected user information to generate third content in which a forensic mark corresponding to the user information has been inserted; and transmitting the third content.

The method for forensic marking of digital content may further include, before reading the first content and the second content from the content database: determining whether the first content and the second content are in the content database; when the first content and the second content are not in the content database, inserting the first binary forensic mark in the original content to generate the first content; inserting the second binary forensic mark in the original content to generate the second content; and storing the first content and the second content in the content database.

Generating the first content and generating the second content may include determining a unit in which the first binary forensic mark and the second binary forensic mark are inserted on the basis of a type or size of the original content, and then inserting the first binary forensic mark and the second binary forensic mark in the original content per the determined unit.

The first content and the second content may have identical data sizes to each other, and the same playing time as the original content.

The user information may include at least one piece of information among a user ID, content request time, content provision time, and content information.

Generating the third content in which the forensic mark corresponding to the user information may include combining the first content and the second content in a size corresponding to a multiple of a reference value of a frame size or packet size on the basis of a type of the original content.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
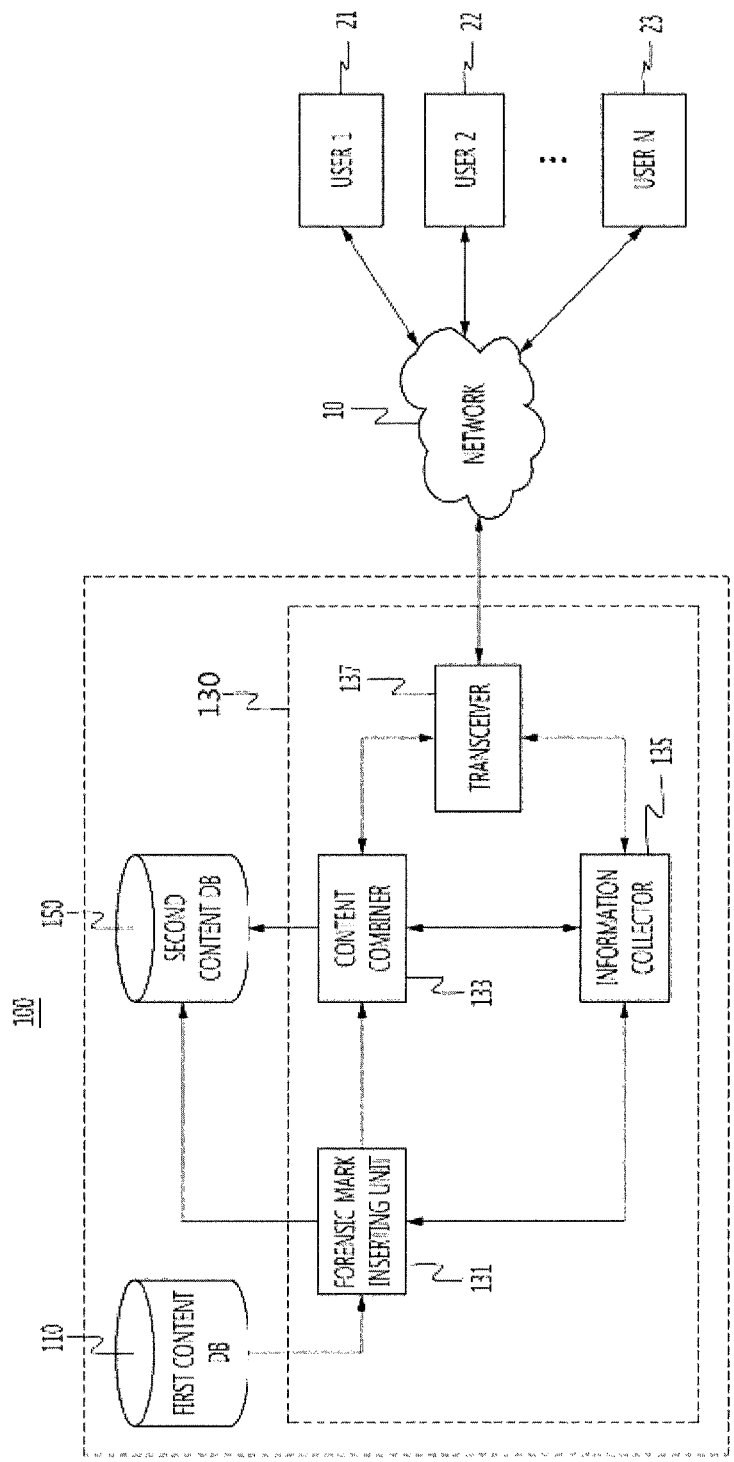
FIG. 1 is a block diagram of an apparatus for forensic marking of digital content according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described with reference to appended drawings.

FIG. 1 is a block diagram of an apparatus for forensic marking of digital content according to an example embodiment of the present invention.

Referring to FIG. 1, an apparatus 100 for forensic marking of digital content includes a first content database 110 storing original content, a forensic marker 130, and a second content database 120 storing content in which a binary forensic mark has been inserted.

Before a service request is generated, the apparatus 100 for forensic marking of digital content generates a pair of content by respectively inserting binaries "0" and "1" in the original content, and then stores the pair of content in the second content database 150.

Subsequently, at a point in time when a content service request is generated by users 21 to 23, the apparatus 100 for forensic marking of digital content recombines the pair of content, in which "0" and "1" are inserted respectively, in predetermined length units to insert user information including an identification (ID) of the user as a forensic mark, and then serves the recombined content to the user via a network 10. Here, the apparatus 100 for forensic marking of digital content sets a combination length to a size corresponding to a multiple of a reference value of a frame size or packet size of the content so that a forensic mark detector can readily detect the forensic mark inserted in the content.

The apparatus 100 for forensic marking of digital content according to an example embodiment of the present invention will be described in detail with reference to FIG. 1. The first content database 110 in which original content is stored includes pieces of original content provided by a content service provider. Here, the original content may be multimedia data such as a digital sound source, video, text, and image, and codecs that have encoded respective pieces of content may differ from each other.

Although the first content database 110 is directly connected to the forensic marker 130 in FIG. 1, the first content database 110 may be separately installed in a content provider and connected with the forensic marker 130 via the network in another example embodiment of the present invention. In other words, the apparatus 100 for forensic marking of digital content may be configured to receive original content from the first content database 110 via the network 10.

The forensic marker 130 may include a forensic mark inserting unit 131, a content combiner 133, an information collector 135, and a transceiver 137.

The forensic mark inserting unit 131 reads original content stored in the first content database 110, generates pieces of content in which a forensic mark having a binary "0" and a forensic mark having a binary "1" are inserted respectively, and then stores the generated content in the second content database 150 or provides the generated content to the content combiner 133. Here, the pair of content, in which the forensic marks of "0" and "1" are inserted respectively, have the same playing time as the original content, and identical lengths to each other.

The forensic mark inserting unit 131 inserts a forensic mark all over the original content data, and the content in which the forensic mark has been inserted has the same bit rate and file structure as the original content. Also, respective pieces of content in which the forensic mark has been inserted do not have mutual relation during an encoding process, and thus respective portions of the content can be processed in a distributed fashion. The forensic mark inserting unit 131 may insert forensic marks having binaries "0" and "1" in frame units, packet units or group of picture (GOP) units according to a type of the original content. For example, when the original content is video data, a forensic mark may be inserted in GOP units, and when the original content is audio data, a forensic mark may be inserted in frame or packet units.

Also, the forensic mark inserting unit 131 may set a combination length to a size corresponding to a multiple of a reference value of a frame size or packet size of content in consideration of the length of the content, or may receive information about a set combination length from the information collector 135. For example, the forensic mark inserting unit 131 may insert a forensic mark in units of one packet of the content, or in units of a combination length corresponding to the multiple, such as two packets or three packets, according to the length of the content.

When a content service request is received from a user, the content combiner 133 receives user information corresponding to the user who has requested the content service from the information collector 135, reads the corresponding pair of content, in which the forensic marks of binaries of "0" and "1" are inserted, from the second content database 150, and then generates content to be served by combining the pair of content in which the forensic marks of "0" and "1" are inserted on the basis of the received user information. The content to be served generated by the content combiner 133 has the same playing time as the original content.

Also, combination units combined by the content combiner 133 may be the same as units in which a forensic mark has been inserted by the forensic mark inserting unit 131. For example, when the forensic mark inserting unit 131 inserts forensic marks of "0" and "1" in packet units, the content combiner 133 may combine content in which "0" has been inserted in packet units and content in which "1" has been inserted in packet units.

The information collector 135 collects user information required to provide a user with content in which a forensic mark has been inserted, and provides the collected user information to the content combiner 133. Here, the user information may include information about content that the user has requested, a user ID, content request time, content provision (download) time information, and other additional information.

Also, the information collector 135 may insert a forensic mark in the original content and perform control required for service. For example, when a service request for predetermined content is generated, the information collector 135 informs the forensic mark inserting unit 131 and/or the content combiner 133 that the service request has been generated, determines a combination length (e.g., a packet length or byte length) in which a forensic mark is inserted so that a forensic mark detector can readily detect the forensic mark, and provides the determined combination length to the forensic mark inserting unit 131 and/or the content combiner 133. Here, the combination length may be set to a multiple of a basic packet length or basic byte length of the content, and the basic packet length or basic byte length may vary according to a type of the content.

The transceiver 137 may be configured as a wired or wireless network interface. Under the control of the information collector 135 performing a control function, the transceiver 137 receives information and billing information about content whose purchase request is received, user information, etc. via the network 10, provides the received information to the information collector 135, and transmits the content to be served in which a forensic mark has been inserted from the content combiner 133 to the corresponding users 21 to 23 via the network.

The second content database 150 stores the pair of content provided by the forensic mark inserting unit 131 and in which the forensic marks of the binaries "0" and "1" are inserted respectively. The pair of content in which the forensic marks of the binaries "0" and "1" are inserted respectively may be stored before a content service request of a user is generated.

Figure 2:
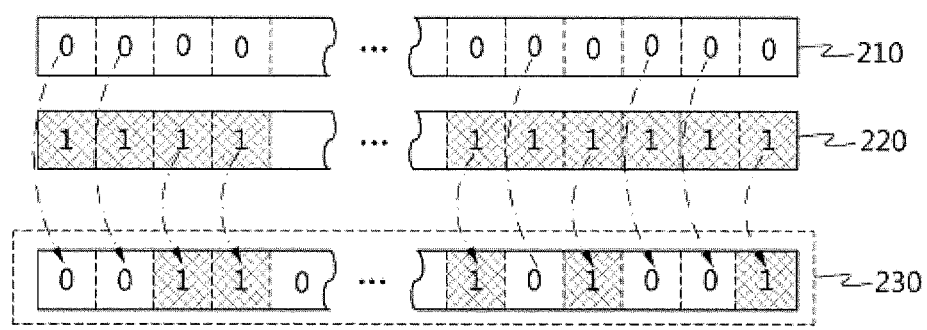
FIG. 2 is a conceptual diagram illustrating operation of the apparatus for forensic marking of digital content shown in FIG. 1.

FIG. 2 is a conceptual diagram illustrating operation of the apparatus for forensic marking of digital content shown in FIG. 1, showing an example of combining pieces of content in which a forensic mark has been inserted in packet units.

Referring to FIG. 2, the forensic mark inserting unit 131 first generates content 210 by inserting a forensic mark of a binary "0" in respective packets constituting original content and content 220 by inserting a forensic mark of a binary "1" in the respective packets, and then stores the pair of content 210 and 220 in which "0" and "1" are inserted in the second content database 150. Here, the content 210 in which the forensic mark of "0" has been inserted and the content 220 in which the forensic mark of "1" has been inserted have identical data lengths and the same playing time as the original content.

Subsequently, when a content service request of a user is generated, the content combiner 133 reads the pair of content 210 and 220 stored in the second content database 150 and in which "0" and "1" are inserted, and generates content 230 to be served in which a forensic mark has been inserted by combining the pair of content 210 and 220 in which "0" and "1" are inserted on the basis of user information provided by the information collector 135. Here, the content 230 to be served in which a forensic mark has been inserted has the same playing time and the same file structure as the original content.

Although forensic marks are inserted and combined in units of one packet in FIG. 2, the present invention is not limited to this case. It is apparent that forensic marks may be inserted and combined in various units and combination lengths according to a type of content and a size of content data.

Figure 3:
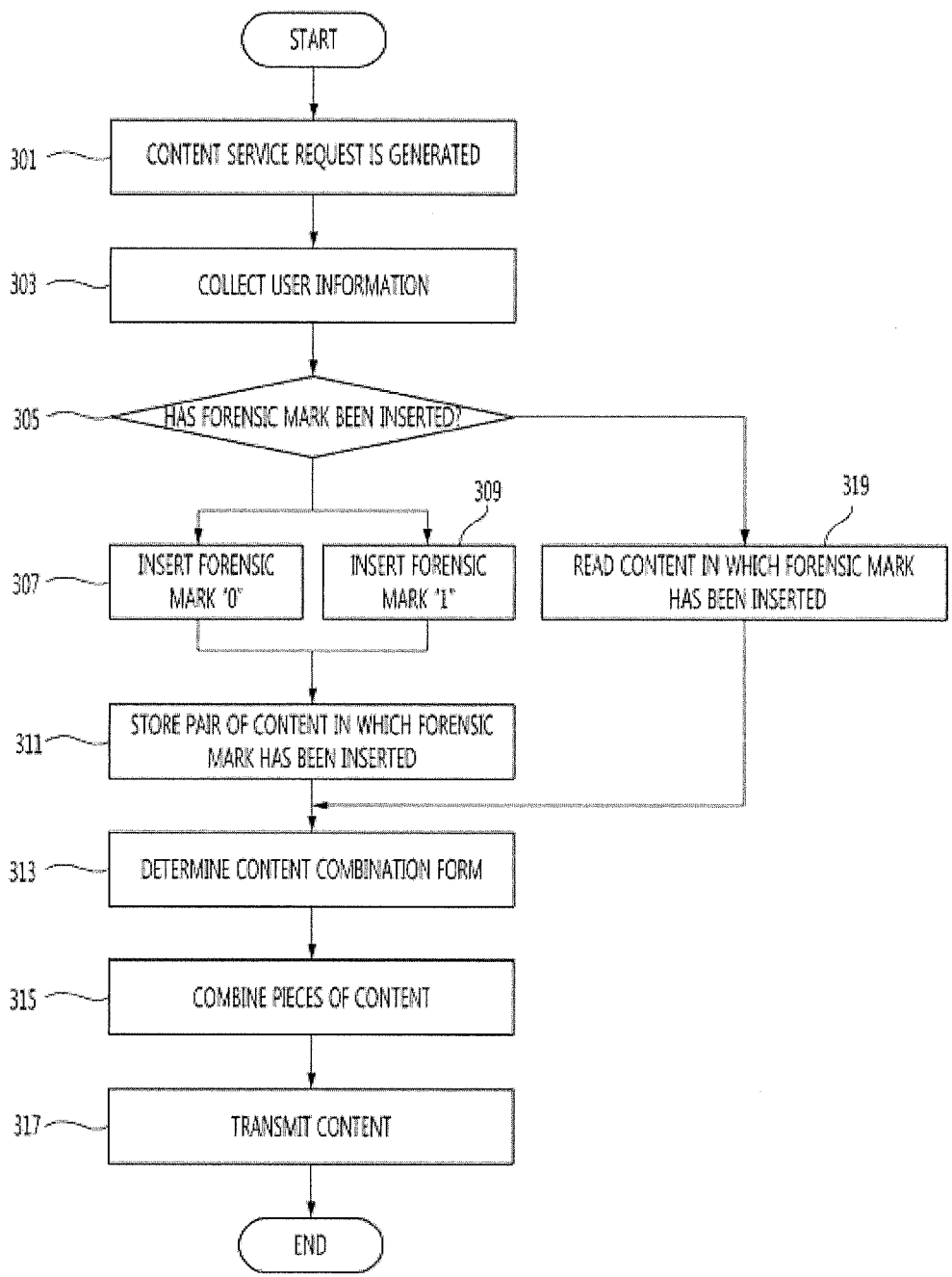
FIG. 3 is a flowchart illustrating a method for forensic marking of digital content according to an example embodiment of the present invention.

FIG. 3 is a flowchart illustrating a method for forensic marking of digital content according to an example embodiment of the present invention.

A method for forensic marking of digital content according to an example embodiment of the present invention will be described with reference to FIG. 3. When a service request (e.g., a download request) for predetermined content is generated by a user (step 301), an apparatus for forensic marking of digital content collects information about the user who has requested the content service (step 303).

Subsequently, the apparatus for forensic marking of digital content determines whether forensic marks of "0" and "1" are inserted in the predetermined content requested by the user (step 305). When it is determined that the forensic marks of "0" and "1" are not inserted in the predetermined content, the apparatus for forensic marking of digital content inserts the forensic mark of a binary "0" in the content (step 307) and the forensic mark of a binary "1" in the content (step 309), and then stores the pair of content in which the forensic marks of "0" and "1" are inserted (step 311).

Subsequently, the apparatus for forensic marking of digital content determines a content combination form on the basis of collected user information (or user information to be inserted in the content as a forensic mark) (step 313), and combines the pieces of content in which the forensic marks of "0" and "1" are inserted according to the determined combination form (step 315). Here, user information inserted through the combination of content in which the forensic marks of "0" and "1" are inserted may include a user ID, content name, service request time, download time, or so on.

Subsequently, the apparatus for forensic marking of digital content transmits the combined content to the user via a network (step 317).

On the other hand, when it is determined in step 305 that the forensic marks of "0" and "1" are inserted in the predetermined content requested by the user, the apparatus for forensic marking of digital content reads the pair of content in which the forensic marks of "0" and "1" are inserted from a database without performing steps 307 to 311 (step 319), and then proceeds to step 313 to perform the following steps.

As illustrated in FIG. 3, in the method for forensic marking of digital content according to an example embodiment of the present invention, a pair of content obtained by inserting forensic marks of "0" and "1" in original content is generated in advance, and at a point in time when a content service request of a user is generated, the pair of content is recombined in packet units, user information (a content name, user ID, service request time, download time, etc.) is inserted using a forensic mark signal, and then the content in which the forensic marks have been inserted is transmitted to a user.

Thus, in comparison with a conventional forensic mark inserting method, the method for forensic marking of digital content according to an example embodiment of the present invention enables accurate and systematic management of works and facilitates tracking of a distribution path of illegally-distributed digital content. Also, since previously-inserted content is edited in packet or frame units, decoding and encoding processes are not needed. Thus, it is possible to drastically reduce a processing time of generating and inserting a forensic mark, and provide service even when content service requests are generated by a plurality of users, which improves the convenience of users.

The above-described apparatus and method for forensic marking of digital content insert 0 and 1 in respective pieces of original content, and then combine the pieces of digital content in which 0 and 1 are inserted respectively on the basis of user information including a purchaser ID and provide the combined digital content to a purchaser at a point in time when a service request is generated by a user.

Consequently, delay time caused by insertion of a forensic mark can be removed, and it is possible to prevent a user from becoming discouraged by application of content copyright protection technology by rapidly providing service at a point in time when the user requests the service. Also, a copyright holder can distribute content whose copyright can be protected.

Furthermore, it is possible to insert various pieces of user information, such as a user ID, content name, purchase time, and purchase site, in content. Thus, illegally-distributed content itself enables management of a work and tracking of a leakage path, and a storage space for tracking illegally copied content is not necessary.

While the example embodiments of the present invention and their advantages have been described in detail, it should be understood that various changes, substitutions and alterations may be made herein without departing from the scope of the invention.

What is claimed is:
1. An apparatus for forensic marking of digital content, comprising:
a forensic marker configured to generate first content by inserting a first binary forensic mark in original content and second content by inserting a second binary forensic mark in the original content, and when a content service request is generated, combine the first content and the second content on the basis of information about a user who has requested the content service and thereby generate third content in which a forensic mark corresponding to the user information is inserted, wherein the forensic marker generates the first and second content by inserting the first and second binary forensic marks all over the original content, respectively, and the first and second content comprises multiple pieces of content in which at least one of the first and second binary forensic marks is inserted;

a content database configured to store the first and second content; and a transceiver configured to transmit the third content.

2. The apparatus of claim 1, wherein the forensic marker includes:

a forensic mark inserting unit configured to generate the first content by inserting a forensic mark of a binary "0" in the original content and the second content by inserting a forensic mark of a binary "1" in the original content, and then store the first and second content in the content database;

an information collector configured to collect the information about the user who has requested the content service and provide the collected user information when the content service request is generated; and a content combiner configured to generate the third content by combining the first content and the second content on the basis of the provided user information.

3. The apparatus of claim 1, wherein the first content and the second content have identical data sizes to each other, and the same playing time as the original content.

4. The apparatus of claim 1, wherein the user information includes at least one piece of information among a user identification (ID), content request time, content provision time, and content information.

5. The apparatus of claim 1, wherein the forensic marker combines the first content and the second content in a size corresponding to a multiple of a reference value of a frame size or packet size on the basis of a type of the original content.

6. The apparatus of claim 1, wherein the forensic marker determines a unit in which the first binary forensic mark and the second binary forensic mark are inserted on the basis of a type or size of the original content.

7. A method for forensic marking of digital content in a digital content forensic marking apparatus, comprising:

collecting information of a user who requests a content service;

when first content obtained by inserting a first binary forensic mark in content requested by the user and second content obtained by inserting a second binary forensic mark in the content are in a content database, reading the first content and the second content from the content database, wherein the first and the second binary forensic marks are inserted all over the content to obtain the first and second content, respectively, and the first and second content comprises multiple pieces of content in which at least one of the first and second binary forensic marks is inserted;

combining the first content and the second content on the basis of the collected user information to generate third content in which a forensic mark corresponding to the user information has been inserted; and transmitting the third content.

8. The method of claim 7, further comprising, before reading the first content and the second content from the content database:

determining whether the first content and the second content are in the content database;

when the first content and the second content are not in the content database, inserting the first binary forensic mark in the original content to generate the first content;

inserting the second binary forensic mark in the original content to generate the second content; and storing the first content and the second content in the content database.

9. The method of claim 8, wherein generating the first content and generating the second content include determining a unit in which the first binary forensic mark and the second binary forensic mark are inserted on the basis of a type or size of the original content, and then inserting the first binary forensic mark and the second binary forensic mark in the original content per the determined unit.

10. The method of claim 7, wherein the first content and the second content have identical data sizes to each other, and the same playing time as the original content.

11. The method of claim 7, wherein the user information includes at least one piece of information among a user identification (ID), content request time, content provision time, and content information.

12. The method of claim 7, wherein generating the third content in which the forensic mark corresponding to the user information has been inserted includes combining the first content and the second content in a size corresponding to a multiple of a reference value of a frame size or packet size on the basis of a type of the original content.

13. The apparatus of claim 1, wherein the original content is divided to generate a plurality of pieces of the original content, and the forensic marker inserts the first and second binary forensic marks in each of the plurality of the original content.

14. The apparatus of claim 13, wherein the plurality of pieces of the original content in which a forensic mark has been inserted do not have a mutual relation.

* * * * *